(12) United States Patent
Mercer et al.

(10) Patent No.: US 11,219,853 B1
(45) Date of Patent: *Jan. 11, 2022

(54) NEGATIVE AIR FILTRATION SYSTEM

(71) Applicant: Carrier Corporation, Palm Beach Gardens, FL (US)

(72) Inventors: Kevin Mercer, Danville, IN (US); Michael J. Smith, Greenwood, IN (US)

(73) Assignee: Carrier Corporation, Palm Beach Gardens, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/303,370

(22) Filed: May 27, 2021

Related U.S. Application Data

(63) Continuation of application No. 17/249,652, filed on Mar. 9, 2021.

(60) Provisional application No. 63/008,895, filed on Apr. 13, 2020.

(51) Int. Cl.
   *B01D 46/00* (2006.01)
   *B01D 46/44* (2006.01)

(52) U.S. Cl.
   CPC ..... *B01D 46/0049* (2013.01); *B01D 46/0005* (2013.01); *B01D 46/0023* (2013.01); *B01D 46/0086* (2013.01); *B01D 46/44* (2013.01); *B01D 2265/025* (2013.01); *B01D 2271/02* (2013.01); *B01D 2273/30* (2013.01); *B01D 2279/51* (2013.01)

(58) Field of Classification Search
   CPC ............... B01D 46/02; B01D 46/0005; B01D 46/0023; B01D 46/0086; B01D 46/2411; B01D 2271/02; B01D 2273/30; A47L 9/19; F24F 3/163; F24F 8/192
   USPC ........... 55/467, 473, 485, 385.2, 419, 350.1; 454/187, 255
   See application file for complete search history.

(56) References Cited

U.S. PATENT DOCUMENTS

| 3,936,284 A | 2/1976 | Mason |
| 4,979,967 A | 12/1990 | Walter |
| 5,074,894 A | 12/1991 | Nelson |
| 5,761,908 A | 6/1998 | Oas |

(Continued)

FOREIGN PATENT DOCUMENTS

| CN | 2621651 Y | 6/2004 |
| CN | 2655083 Y | 11/2004 |

(Continued)

*Primary Examiner* — Minh Chau T Pham
(74) *Attorney, Agent, or Firm* — James A. Edwards

(57) ABSTRACT

A negative air filtration system and a method of operating a negative air filtration system are provided. The negative air filtration system includes a housing, a pre-filter, a HEPA filter, and a fan assembly. The housing including an inlet and an outlet. The pre-filter is disposed within the housing, downstream of the inlet. The HEPA filter is disposed within the housing, downstream of the pre-filter. The fan assembly is disposed within the housing, downstream of the pre-filter. The fan assembly is in airflow communication with the pre-filter and the HEPA filter. The fan assembly is configured to generate a negative pressure across the pre-filter. The fan assembly may include a constant torque motor. The negative air filtration system is designed to have reduced complexity and increased reliability when compared to existing negative air filtration systems.

18 Claims, 11 Drawing Sheets

(56) References Cited

U.S. PATENT DOCUMENTS

| | | | | |
|---|---|---|---|---|
| 5,853,441 A * | 12/1998 | Groen | | B01D 46/02 55/350.1 |
| 6,602,128 B1 | 8/2003 | Spengler | | |
| 6,811,587 B1 * | 11/2004 | Lorey | | F24F 3/163 55/385.2 |
| 7,303,613 B2 * | 12/2007 | Rosenzweig | | A47L 9/19 116/268 |
| 7,326,387 B2 | 2/2008 | Arts | | |
| 7,625,277 B2 * | 12/2009 | Palmer | | F24F 8/192 454/255 |
| 7,833,305 B1 * | 11/2010 | Studer | | B01D 46/2411 55/419 |
| 2003/0110946 A1 * | 6/2003 | Lehman | | B01D 53/0407 95/273 |
| 2004/0107679 A1 * | 6/2004 | Ono | | B01L 1/04 55/385.2 |
| 2005/0280384 A1 * | 12/2005 | Sulfstede | | F04D 27/004 318/432 |
| 2012/0137876 A1 * | 6/2012 | Miller | | B01D 46/10 95/23 |
| 2013/0061567 A1 * | 3/2013 | Kawasaki | | B08B 15/02 55/385.2 |
| 2015/0265959 A1 * | 9/2015 | Crabtree | | B01D 46/0023 55/485 |
| 2015/0359921 A1 | 12/2015 | Palmer | | |
| 2016/0016102 A1 * | 1/2016 | Maddox | | G06F 1/20 55/467 |
| 2018/0055033 A1 | 3/2018 | Nagata | | |
| 2019/0093906 A1 | 3/2019 | Volle | | |

FOREIGN PATENT DOCUMENTS

| | | |
|---|---|---|
| CN | 1550725 A | 12/2004 |
| CN | 1985130 A | 6/2007 |
| CN | 201727663 U | 2/2011 |
| CN | 104566729 A | 4/2015 |
| CN | 105708629 A | 6/2016 |
| EP | 2455675 A2 | 5/2012 |
| EP | 3390922 A1 | 10/2018 |
| JP | 2003185204 A | 7/2003 |
| KR | 1646524 B1 | 8/2016 |
| KR | 20160134962 A | 11/2016 |
| KR | 20190018181 A | 2/2019 |
| WO | 2016013469 A1 | 1/2016 |
| WO | 2016116656 A1 | 7/2016 |

\* cited by examiner

NEGATIVE AIR FILTRATION SYSTEM

CROSS REFERENCE TO A RELATED APPLICATION

The application is a continuation of U.S. Non-Provisional application Ser. No. 17/249,652 filed Mar. 9, 2021, the contents of which are hereby incorporated in their entirety.

BACKGROUND

Negative air machines are used to remove contaminants from the air of an enclosed space. For example, negative air machines may be used to remove asbestos, mold, and/or microbes from the air. Once the negative air machine filters the contaminants from the air, depending on the configuration, the air may be either recycled within the space, or exhausted outside the space.

Negative air machines have been found to be particularly useful in hospital settings, where negative air machines are placed in particular rooms. Specifically, negative air machines have been used in various types of isolation rooms (e.g., airborne infection isolation (AII) rooms, protective isolation/environment (PE) rooms, convertible isolation rooms, and combination AII/PE rooms). By placing the negative air machines in these rooms, the spread of infectious diseases may be prevented, or at least mitigated.

To remove the microbes from the air, traditional negative air machines include a fan, at least one pre-filter, and a HEPA filter. The fan is used to create a negative pressure and draw air into the negative air machine (e.g., through the inlet and out of the outlet). The pre-filter is used to remove larger particles and debris from the air (e.g., large dust particles, hair, etc.). The HEPA filter is used to remove smaller particles from the air (e.g., the microbes). Commonly, the fan is disposed at the inlet of the negative air machine, with one or more of the filters (e.g., the pre-filter and/or the HEPA filter) disposed downstream of the fan. This generates a positive pressure across the filter(s) downstream of the fan. This positive pressure may cause increased stress on the filter(s) and/or on any seal around the filter(s), which may result in a leak of contaminants (e.g., either through a hole in a filter or through an opening in a seal around a filter). If contaminants are able to leak through the negative air machine then the negative air machine may not reliably prevent the spread of infectious diseases.

To reliably prevent the spread of infectious disease (e.g., to effectively remove contaminants from the air), the filters of the negative air machines need to remain unclogged. To help detect clogged filters microprocessors are commonly used. Traditionally, microprocessors are connected to the fan assembly (e.g., to the motor powering the fan) to detect an increase in power consumption. An increase in power consumption may indicate that a filter is clogged and is in need of replacement. However, this use of microprocessors may cause an unnecessary dependence and may result in increased complexity for manufacturing.

Accordingly, there remains a need for a negative air machine and method of operating such negative air machine, that is effectively removes contaminants from the air, while also capable of being more easily manufactured.

BRIEF DESCRIPTION

According to one embodiment, a negative air filtration system including a housing, a pre-filter, a HEPA filter, and a fan assembly is provided. The housing includes an inlet and an outlet. The pre-filter is disposed within the housing, downstream of the inlet. The HEPA filter is disposed within the housing, downstream of the pre-filter. The fan assembly is disposed within the housing, downstream of the pre-filter. The fan assembly is in airflow communication with the pre-filter and the HEPA filter. The fan assembly generates a negative pressure across the pre-filter.

In accordance with additional or alternative embodiments, the housing further includes an interior surface, wherein an insulation is disposed on the interior surface.

In accordance with additional or alternative embodiments, the insulation includes an exterior foil surface and a fiberglass body.

In accordance with additional or alternative embodiments, the negative air filtration system further includes a supply duct transition disposed on an upper surface of the housing, the supply duct transition including an outlet flange and an outlet plate, wherein the outlet plate includes a plurality of apertures disposed therein.

In accordance with additional or alternative embodiments, the negative air filtration system further includes a pressure switch, the pressure switch operably connected to an indicator, the indicator disposed on the housing.

In accordance with additional or alternative embodiments, the pressure switch includes a tube, the tube including a first end and a second end, the first end disposed outside the housing and the second end disposed between the fan assembly and the HEPA filter.

In accordance with additional or alternative embodiments, the indicator is configured to signal when at least one of the pre-filter and the HEPA filter are in need of replacement.

In accordance with additional or alternative embodiments, the fan assembly includes a constant torque motor including an operating torque.

In accordance with additional or alternative embodiments, the constant torque motor is operably connected to a selection device, the selection device configured to adjust the operating torque.

In accordance with additional or alternative embodiments, operating torque correlates to an approximately constant RPM, wherein the approximately constant RPM is between 800 and 1500 RPM.

In accordance with additional or alternative embodiments, the fan assembly includes a forward curved wheel blower.

In accordance with additional or alternative embodiments, the HEPA filter includes an exterior perimeter, a sealing assembly disposed about the exterior perimeter; the sealing assembly configured prevent a bypass around the HEPA filter.

In accordance with additional or alternative embodiments, the sealing assembly includes at least one gasket and at least one planar member.

In accordance with additional or alternative embodiments, the negative air filtration system further includes a mounting rail disposed within the housing, the mounting rail disposed adjacent the sealing assembly.

In accordance with additional or alternative embodiments, the inlet is disposed on a lower surface of the housing and the outlet is disposed on an upper surface of the housing, the inlet and the outlet being vertically oriented.

In accordance with additional or alternative embodiments, the negative air filtration system further includes a plurality of wheels disposed on the lower surface of the housing.

In accordance with additional or alternative embodiments, the lower surface includes a surface area less 4 sq. ft.

According to another aspect of the disclosure a method for operating a negative air filtration system is provided. The negative air filtration system including a pre-filter, a HEPA filter disposed downstream of the pre-filter, and a fan assembly including a constant torque motor, the fan assembly disposed downstream of the pre-filter. The method including a step for operating the negative air filtration system at a first required CFM for a first environment, the constant torque motor operating at a first approximately constant torque for the first required CFM. The method further including a step for operating the negative air filtration system at a second required CFM for a second environment, the constant torque motor operating at a second approximately constant torque for the second required CFM.

In accordance with additional or alternative embodiments, the constant torque motor includes a selection device configured to control the operating torque of the constant torque motor between the first approximately constant torque and the second approximately constant torque.

In accordance with additional or alternative embodiments, the first approximately constant torque and the second approximately constant torque each respectively correlate to an approximately constant RPM, the approximately constant RPM between 800 and 1500 RPM.

BRIEF DESCRIPTION OF THE DRAWINGS

The subject matter, which is regarded as the disclosure, is particularly pointed out and distinctly claimed in the claims at the conclusion of the specification. The following descriptions of the drawings should not be considered limiting in any way. With reference to the accompanying drawings, like elements are numbered alike:

DETAILED DESCRIPTION

A negative air filtration system including a housing, a pre-filter, a HEPA filter, and a fan assembly, and a method of operating the negative air filtration system are provided. The negative air filtration system, by disposing the fan assembly downstream of the HEPA filter and the pre-filter, generates a negative pressure across the pre-filter and the HEPA filter. By generating a negative pressure across the filters (e.g., instead of a positive pressure), the negative air filtration system may more reliably prevent the spread of infectious diseases (e.g., compared to existing negative air filtration systems) by avoiding the generation of unneeded stress on the filters and the seal around the filters. Additionally, the negative air filtration system provided herein may have reduced complexity and be more easily manufactured (e.g., compared to existing negative air filtration systems) by avoiding the use of microprocessors to monitor the clogging of the filters. For example, instead of using microprocessors, the negative air filtration system may use a pressure switch to monitor the clogging of the filters. Although described herein to be particularly useful in a hospital setting, it should be appreciated that the negative air filtration system may be used within any environment that is in need of contaminant filtration (e.g., for home remediation, etc.).

Figure 1:
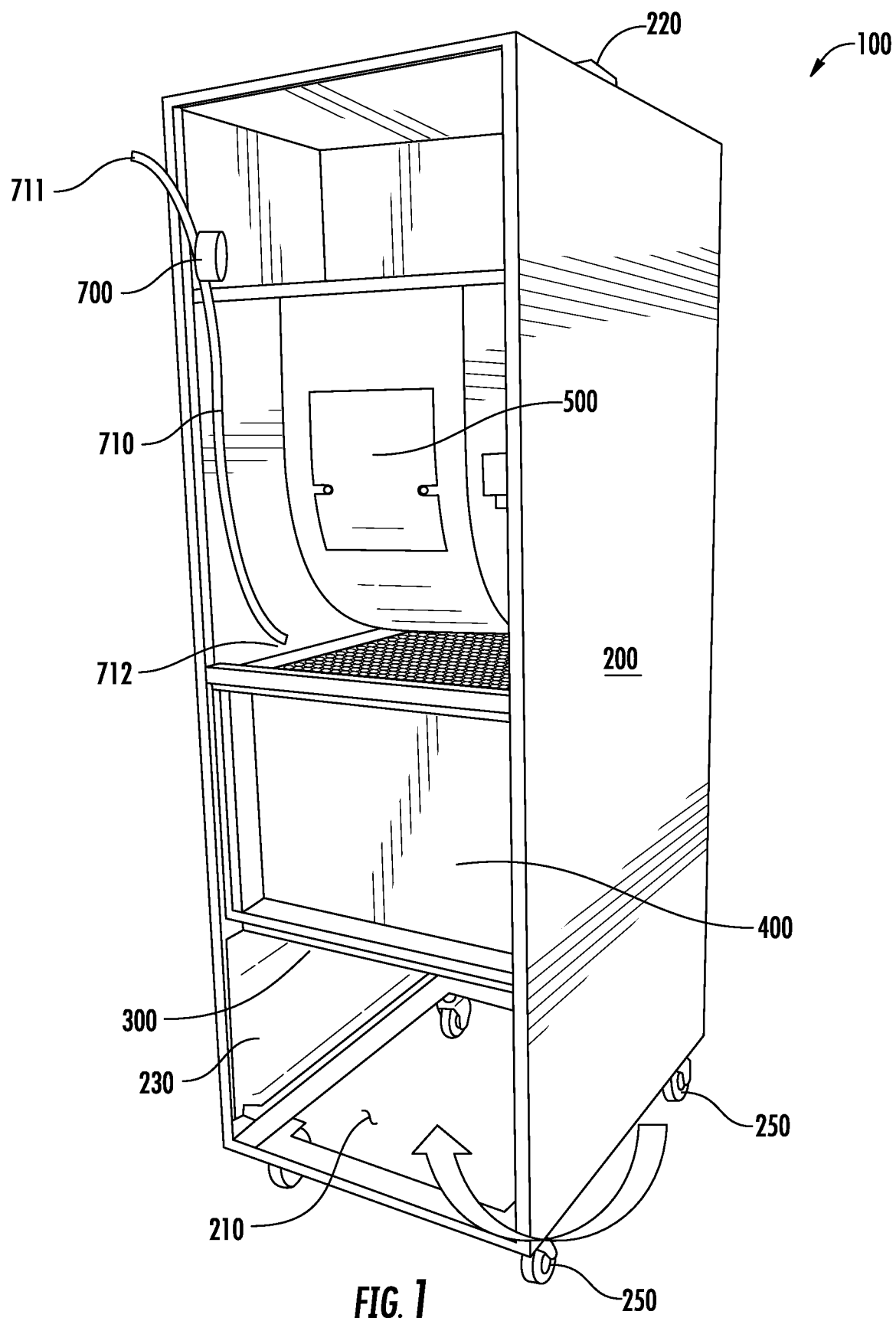
FIG. 1 is a perspective view of a negative air filtration system including a housing, a pre-filter, a HEPA filter, and a fan assembly in accordance with one aspect of the disclosure.

With reference now to the Figures, an exemplary negative air filtration system 100 is shown in FIG. 1. The negative air filtration system 100 includes a housing 200, a pre-filter 300, a HEPA filter 400, and a fan assembly 500. The housing 200 including an inlet 210 and an outlet 220. The pre-filter 300 is disposed within the housing 200, downstream of the inlet 210. The HEPA filter 400 is disposed within the housing 200, downstream of the pre-filter 300. The fan assembly 500 is disposed within the housing 200, downstream of the HEPA filter. The fan assembly 500 is in airflow communication with the pre-filter 300 and the HEPA filter 400. Being in airflow communication may be interpreted to mean that the airflow that is drawn into the negative air filtration system 100 (e.g., by the fan assembly 500) is passed through the fan assembly 500, the pre-filter 300, and the HEPA filter 400. The fan assembly 500 generates a negative pressure across the pre-filter 300 and the HEPA filter 400 (e.g., instead of a positive pressure).

Figure 2:
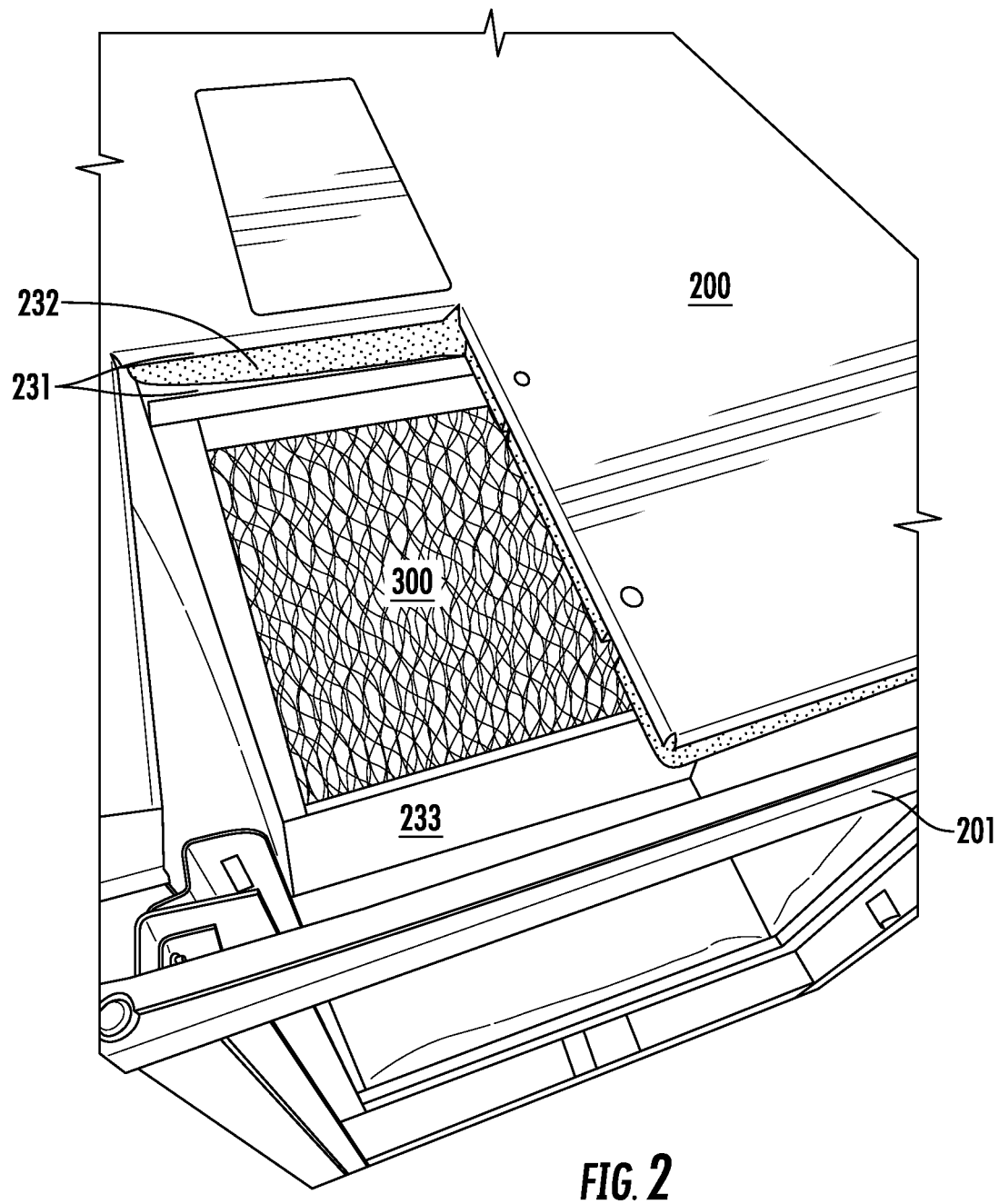
FIG. 2 is a perspective view of the pre-filter, as shown in FIG. 1, with insulation disposed on the interior surface of the housing in accordance with one aspect of the disclosure.

The housing 200 includes an interior surface 230, which may include insulation 231. For example, the housing 200 may be made of one or more pieces of sheet metal joined together (e.g., using any known fastening means) at the corners of the housing 200. The interior surface 230 of the housing 200 may be viewed as the inward facing surface of the pieces of sheet metal. In certain instances, the insulation 231 may line the entire interior surface 230 of the housing 200 to minimize noise outside the housing 200. It should be appreciated that, in certain instances, the insulation 231 lines only a portion of the interior surface 230 of the housing 200 (e.g., may only line the interior surface 230 near the fan assembly 500). As shown in FIG. 2, the insulation 231 may include an exterior foil surface 233 and a fiberglass body 232.

Figure 3:
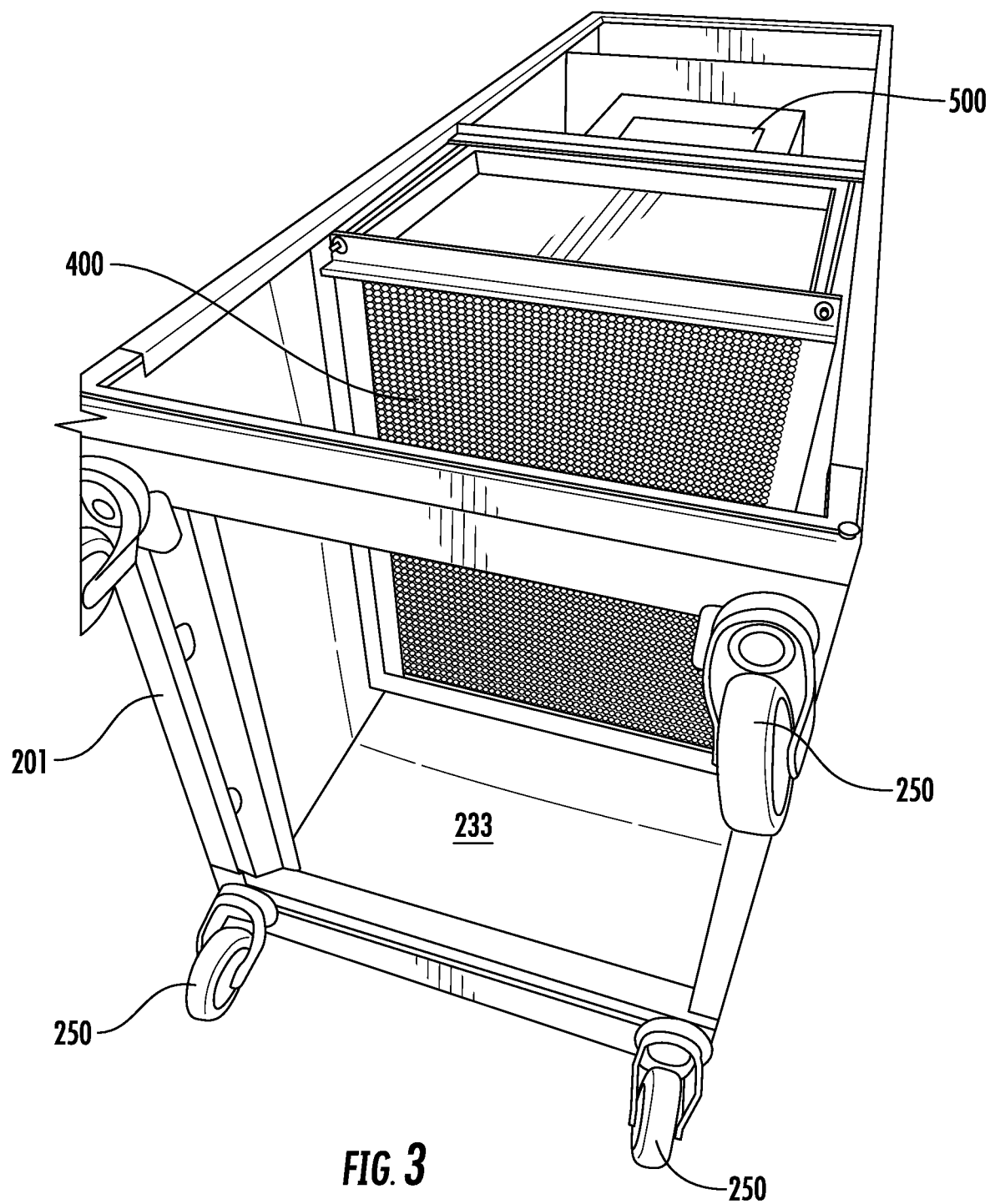
FIG. 3 is a perspective view of the HEPA filter, as shown in FIG. 1, with wheels disposed on the lower surface of the housing in accordance with one aspect of the disclosure.

The pre-filter 300 may be disposed directly adjacent to the HEPA filter 400. A perspective view of a pre-filter 300 installed within the negative air filtration system 100 is shown in FIG. 2. This pre-filter 300 may be easily removable and replaceable (e.g., if/when the pre-filter 300 becomes clogged). The pre-filter 300 may be used to remove larger particles (e.g., hair, dust, etc.) from the air entering the negative air filtration system 100 to avoid the larger particles from clogging the HEPA filter 400. A perspective view of a negative air filtration system 100 with the pre-filter 300 removed is shown in FIG. 3 (e.g., with the HEPA filter 400 exposed). The HEPA filter 400 may be used to remove fine contaminants (e.g., microbes) from the air before the air is either recycled within the space (e.g., back into the room), or exhausted outside the space (e.g., outside of the room and/or building).

Figure 4:
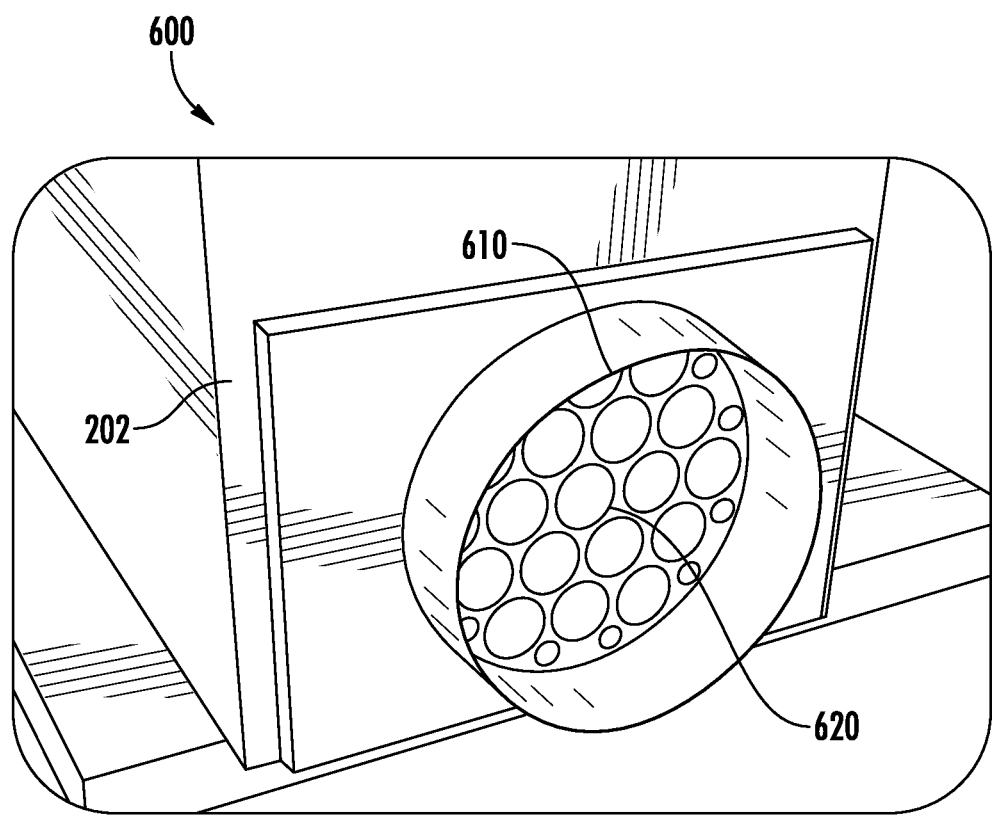
FIG. 4 is a perspective view of a first embodiment of a supply duct transition disposed on the upper surface of the housing in accordance with one aspect of the disclosure.
Figure 5:
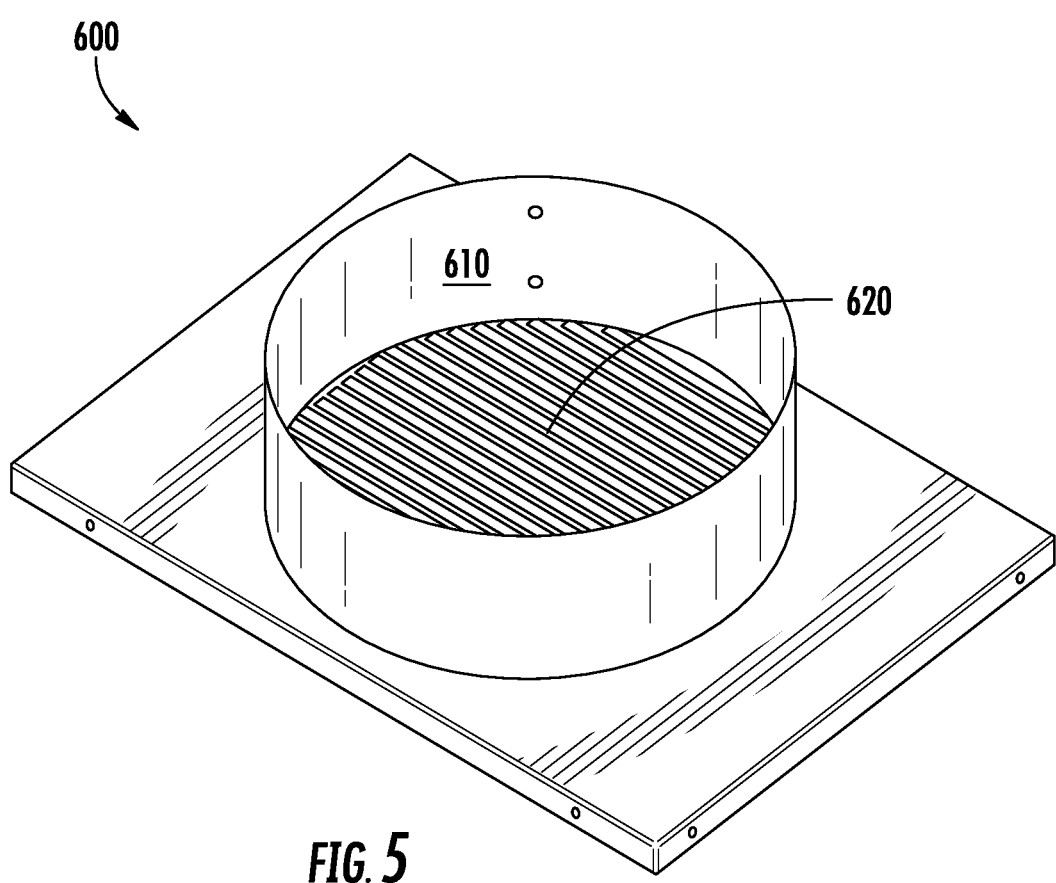
FIG. 5 is a perspective view of a second embodiment of a supply duct transition in accordance with one aspect of the disclosure.

When exiting the negative air filtration system 100, the air may be passed through a duct (not shown). For ease of installation (e.g., to make it easy to connect with the duct), the negative air filtration system 100 may include a supply duct transition 600 (as shown in FIGS. 4 and 5). The supply duct transition 600 may be disposed on an upper surface 202 of the housing 200. The supply duct transition 600 may include an outlet flange 610 and an outlet plate 620 containing a plurality of apertures. The outlet flange 610 may extend circumferentially around the outlet plate 620. The outlet flange 610 may extend substantially perpendicular from the upper surface 202 of the housing 200. Substantially perpendicular may mean that the outlet flange 610 and the upper surface 202 of the housing 200 may form an angle of approximately 90° (e.g., +/−5°). The outlet flange 610 may be sized to allow a duct to be configured over the outlet flange 610 (e.g., to allow the duct to be clamped to the outside of the outlet flange 610). The outlet plate 620 may be configured in any fashion capable of allowing air to flow out of the negative air filtration system 100 and through the duct. A perspective view of a first embodiment of a supply duct transition 600 with one potential outlet plate 620 configuration (e.g., with the plurality of apertures having a circular geometry) is shown in FIG. 4. A perspective view of a second embodiment of a supply duct transition 600 with another potential outlet plate 620 configuration (e.g., with the plurality of apertures configured as slots) is shown in FIG. 5.

Figure 6:
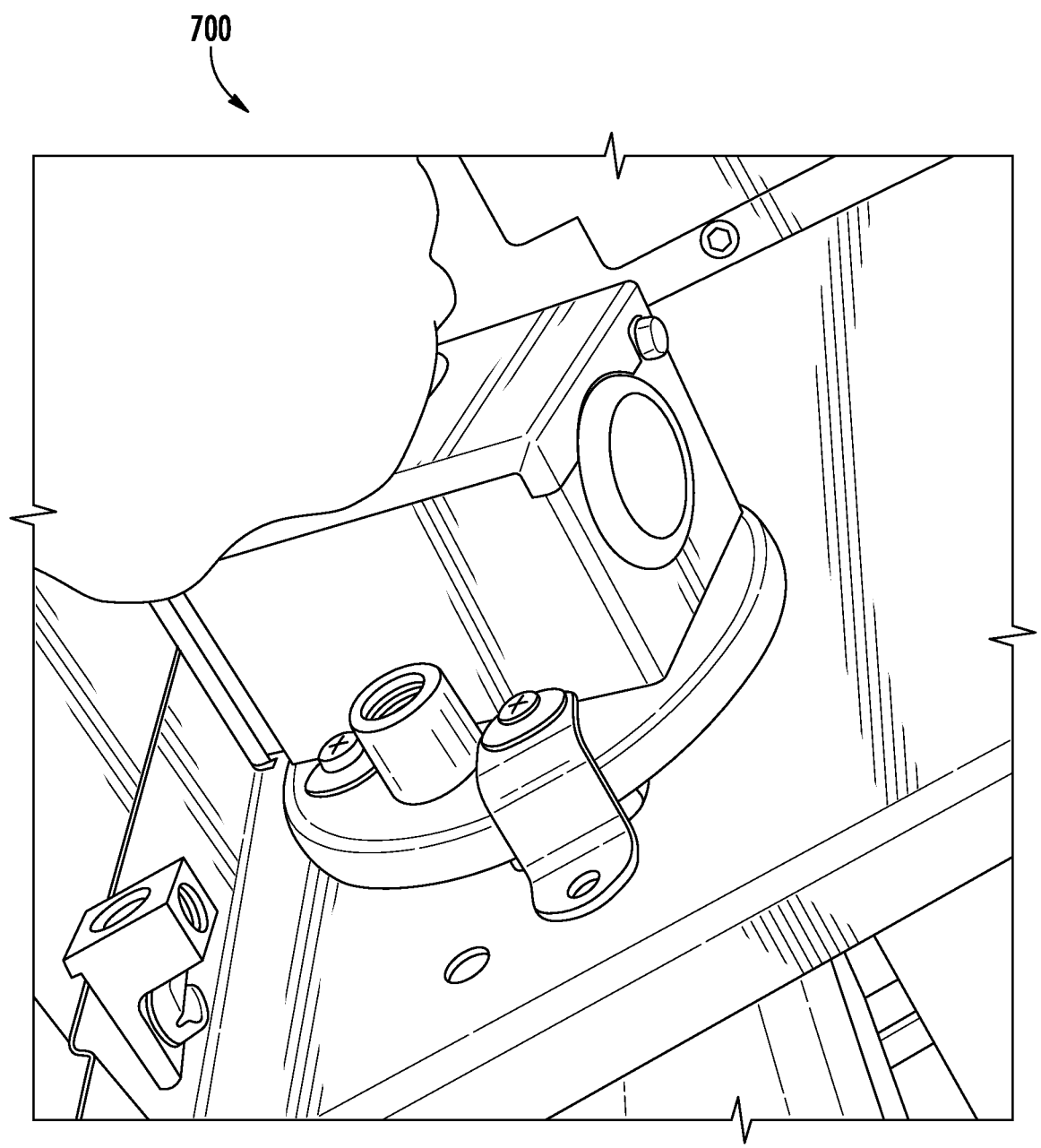
FIG. 6 is a perspective view of a pressure switch in accordance with one aspect of the disclosure.
Figure 7:
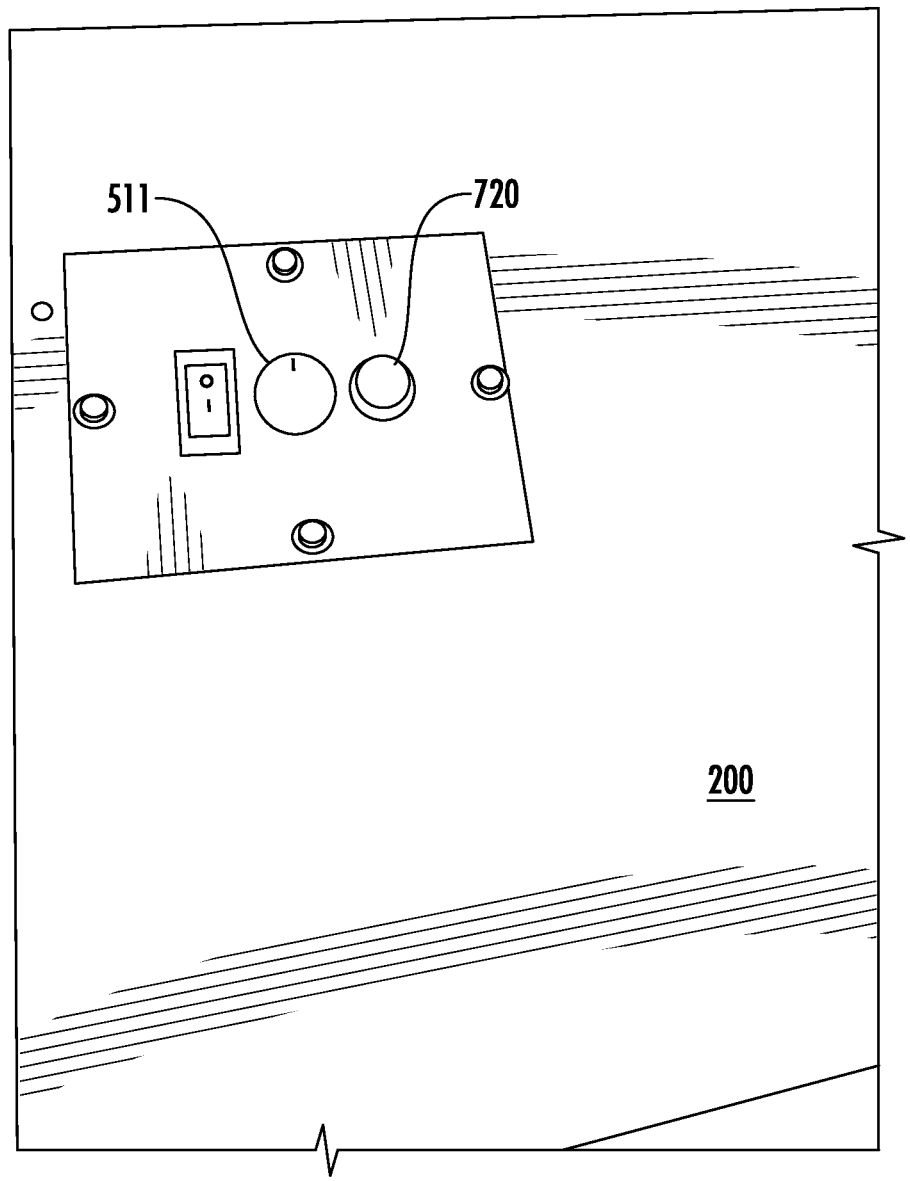
FIG. 7 is a perspective view of an indicator and a dial disposed on the housing in accordance with one aspect of the disclosure.

To function efficiently and effectively remove contaminants from the air, the filters (e.g., the pre-filter 300 and the HEPA filter 400) of the negative air filtration system 100 need to remain unclogged. To monitor the status of the filters the negative air filtration system 100 may include a pressure switch 700 (as shown in FIGS. 1 and 6). The pressure switch 700 may be operably connected to an indicator 720 (e.g., through one or more wired or wireless connections). The indicator 720 may include any device capable of signaling (e.g., capable of generating a sound and/or light). In certain instances, the indicator 720 is a light (e.g., an LED) disposed on the housing 200 (as shown in FIG. 7). The indicator 720 may be used by the negative air filtration system 100 to signal (e.g., by flashing) when at least one of the pre-filter 300 and the HEPA filter 400 are in need of replacement.

The pressure switch 700 may trigger the indicator 720 using a diaphragm (not shown). For example, the pressure switch 700 may have a flexible diaphragm connected to a tube 710 (shown in FIG. 1). The diaphragm may move relative to a change in pressure (e.g., triggering the indicator 720). The tube 710 may include a first end 711 disposed outside the housing 200 (e.g., open to atmosphere) and a second end 712 disposed inside the housing 200 (e.g., between the fan assembly 500 and the HEPA filter 400). Thus, the pressure switch 700 may monitor a pressure change between the fan assembly 500 and the HEPA filter 400 and trigger the indicator 720 when the pressure drops to a point that is indicative of a filter (e.g., the pre-filter 300 or the HEPA filter 400) being clogged to the point that it is in need of replacement. It should be appreciated that the configuration of a pre-filter 300 upstream of the HEPA filter 400 may mitigate the HEPA filter 400 from becoming clogged with larger particles (e.g., dust, hair, etc.). As mentioned above, clogged filters may affect the efficiency of the negative air filtration system 100. For example, a clogged filter may cause the fan assembly 500 to consume more power.

Figure 8:
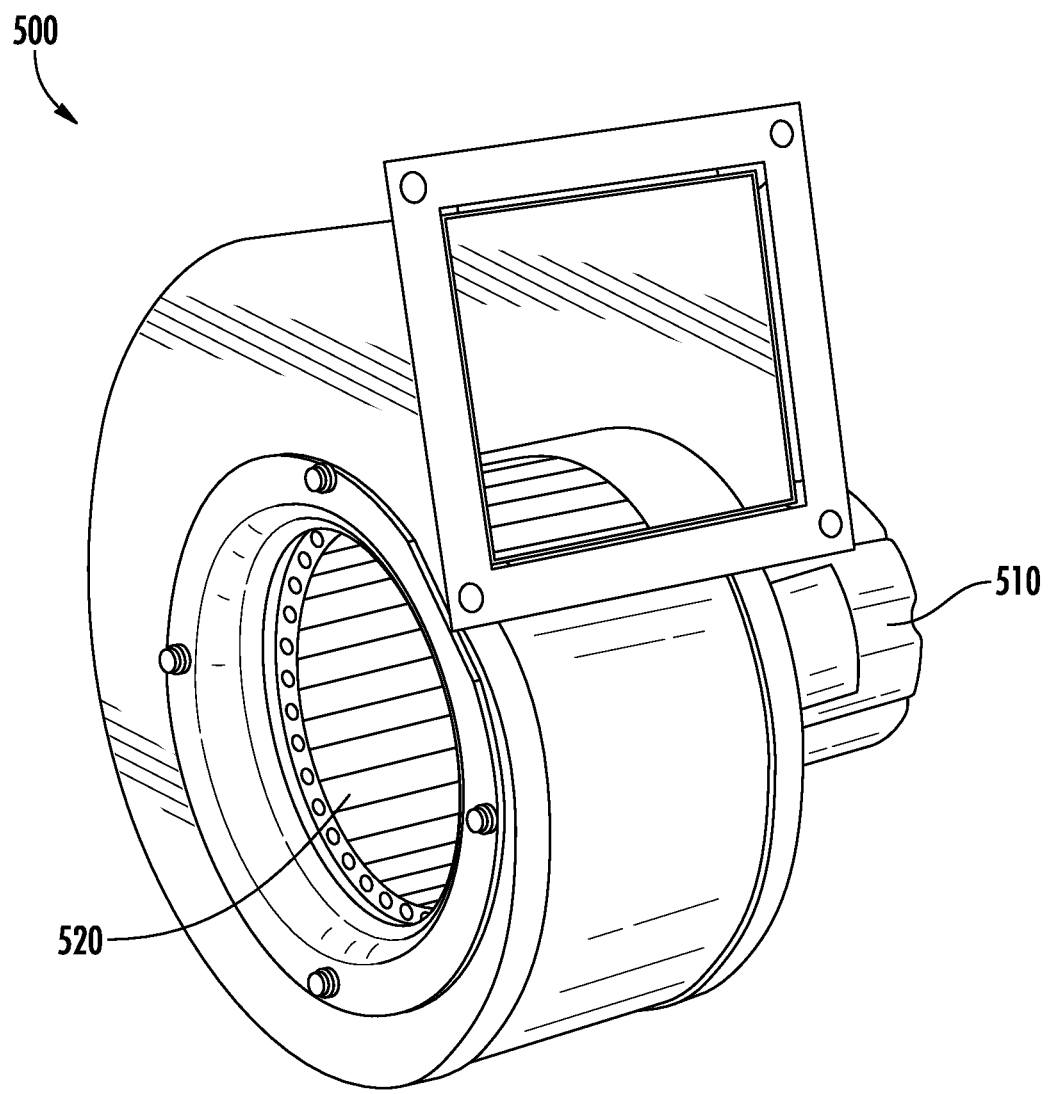
FIG. 8 is a perspective view of a fan assembly, as shown in FIG. 1, with the fan assembly including a constant torque motor and a forward curved wheel blower in accordance with one aspect of the disclosure.

A perspective view of an exemplary fan assembly 500 is shown in FIG. 8. As shown, the fan assembly 500 may include a constant torque motor 510 and a forward curved wheel blower 520. This may mean that the fan assembly 500 may not use a constant CFM motor (e.g., which may incorporate one or more microprocessor). The constant torque motor 510 may be operably connected (e.g., through one or more wired or wireless connections) to a selection device 511 (e.g. a dial shown in FIG. 7). The selection device 511 may be configured to adjust the operating torque (e.g., which may correlate to an approximately constant RPM) between various approximately constant torques. An approximately constant torque may mean that the torque does not vary substantially during operation (e.g., +/−100 Nm from the set torque). For example, the selection device 511 may change the operating torque of the constant torque motor 510 between a number (e.g., five or more) of different present constant torques, which may not vary substantially during operation (e.g., without adjusting the dial 511). In certain instances, the approximately constant RPM for which the torque correlates to is between 800 and 1500 RPM. The selection device 511 may make it possible to adjust the output (e.g., the CFM) of the fan assembly 500 based on the size of the particular space that the negative air filtration system 100 is being used in. For example, the selection device 511 may increase the torque for a larger room and decrease the torque for a smaller room. Regardless of the size of the room, the fan assembly 500 may be used to pull air through the HEPA filter 400 to remove contaminants (e.g., microbes) from the air.

Figure 9:
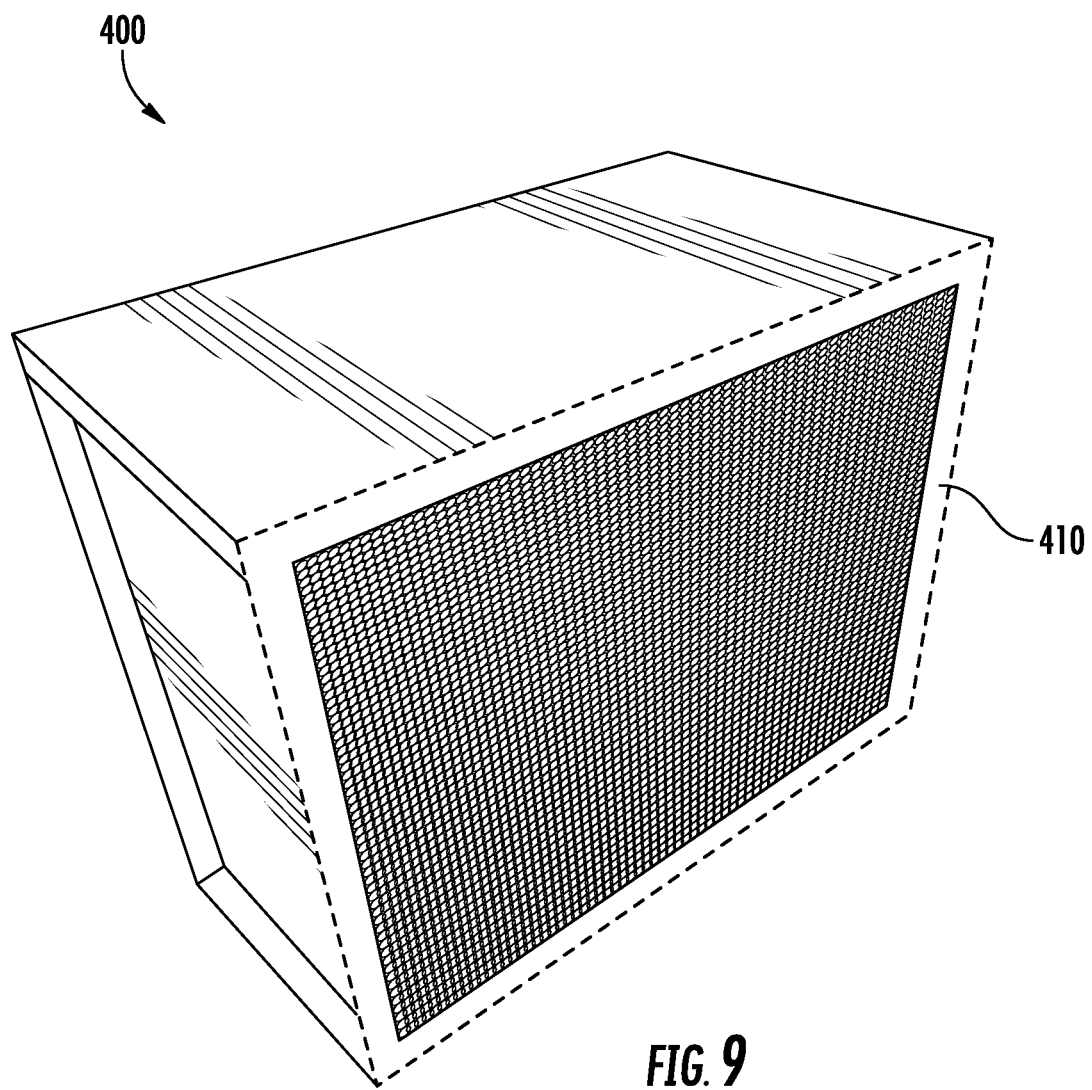
FIG. 9 is a perspective view of a HEPA filter, as shown in FIG. 1, depicting the exterior perimeter of the HEPA filter in accordance with one aspect of the disclosure.
Figure 10:
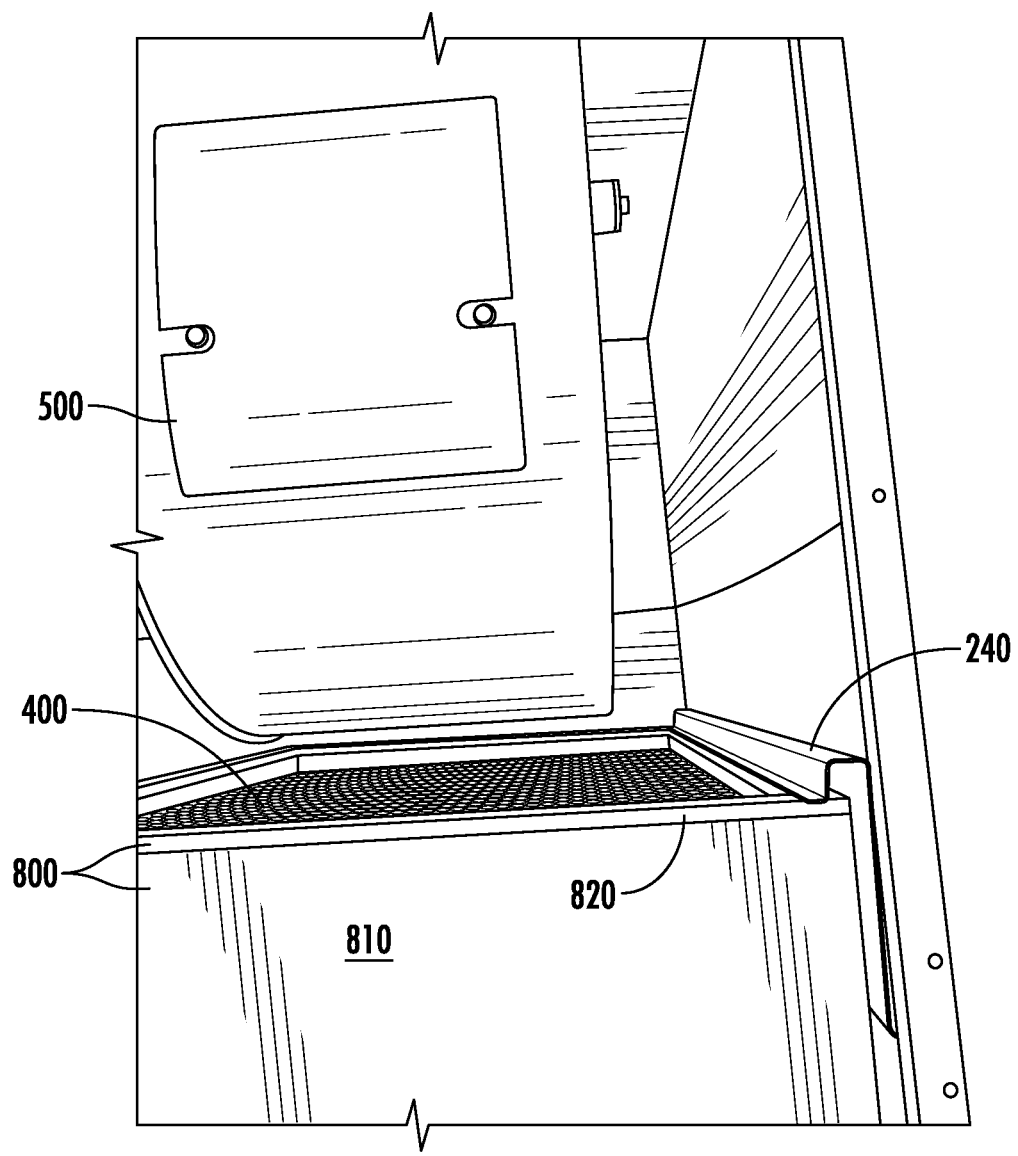
FIG. 10 is a perspective view of a sealing assembly disposed about the exterior perimeter shown in FIG. 9 in accordance with one aspect of the disclosure.

The negative air filtration system 100 may prevent air from bypassing the HEPA filter 400. An exemplary embodiment of a HEPA filter 400 is shown in FIG. 9. As shown in FIG. 9, the HEPA filter 400 may include an exterior perimeter 410. The negative air filtration system 100 may include a sealing assembly 800 disposed about the exterior perimeter 410 (shown in FIG. 10). The sealing assembly 800 may include at least one gasket 820 (e.g., composed of a rubber or silicone material) and at least one planar member 810 (e.g., composed of a sheet metal or plastic). The sealing assembly 800 is configured to prevent a bypass around the HEPA filter 400. For example, the sealing assembly 800 may be configured in such a way that prevents any of the air that enters the negative air filtration system 100 from passing through the outlet 220 without first passing through the HEPA filter 400. In certain instances, the housing 200 includes a mounting rail 240 extending from the interior surface 230. The mounting rail 240 may be disposed adjacent to the sealing assembly 800 (e.g., in an overlapping manner, as shown in FIG. 10).

The design and configuration of the negative air filtration system 100 may make the negative air filtration system 100 easy to install and/or move, which might be advantageous in environments where time is of the essence (e.g., in hospital settings). Additionally, the negative air filtration system 100 may be designed in such a way that it's footprint (e.g., the amount of space required) is minimal. For example, the negative air filtration system 100 may take up less than 4 square feet of floor space (e.g., the surface area of the lower surface 201 may be less than 4 square feet). This may be possible due to the orientation of the negative air filtration system 100. For example, the negative air filtration system 100 may be configured to be vertically oriented (as shown in FIG. 1) where the outlet 220 is disposed on the upper surface 202 and the inlet 210 is disposed on the lower surface 201. The negative air filtration system 100 may include a plurality of wheels 250 disposed on the lower surface 201 of the housing 200. These wheels 250 may make it possible to move the negative air filtration system 100 between rooms (e.g., from one hospital room to another).

As described above, the design and configuration of the negative air filtration system 100 makes it possible to remove contaminants (e.g., microbes) from air in an effective and reliable manner, with reduce complexity (e.g., when compared to existing negative air machines that incorporate microprocessors to monitor the filters). As mentioned, instead of using a constant CFM motor, the negative air filtration system 100 described herein may utilize a constant torque motor 510 connected to a selection device 511. This selection device 511 may make it possible to operate the negative air filtration system 100 in a manner that is consistent with the needs of the environment in which it is being used.

Figure 11:
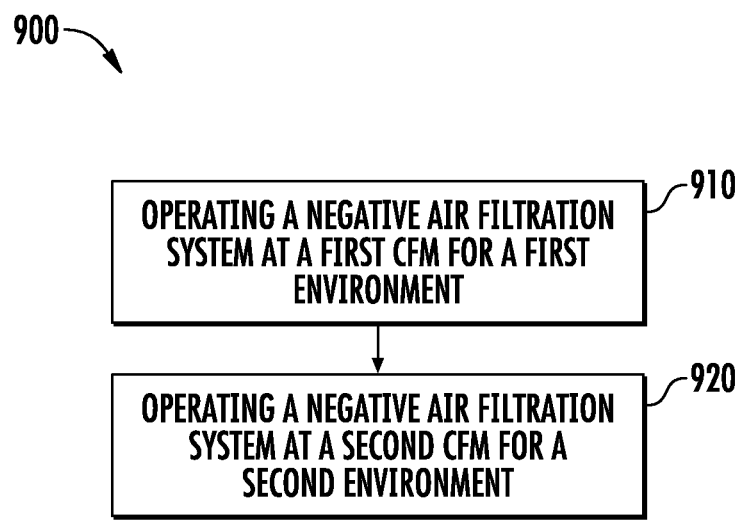
FIG. 11 is a flow diagram illustrating a method of operating a negative air filtration system in accordance with one aspect of the disclosure.

The method 900 for operating a negative air filtration system 100 is shown in FIG. 11. This method 900 may be completed, for example, using the exemplary negative air filtration system 100 shown in FIGS. 1-10. As described above, the negative air filtration system 100 may include a pre-filter 300, a HEPA filter 400 disposed downstream of the pre-filter 300, and a fan assembly 500 including a constant torque motor 510. The fan assembly 500 being disposed downstream of the HEPA filter 400. The method 900 includes step 910 for operating the negative air filtration system 100 at a first required CFM for a first environment. The constant torque motor 510 operating at a first approximately constant torque for the first required CFM. The method 900 includes step 920 for operating the negative air filtration system 100 at a second required CFM for a second environment. The constant torque motor 510 operating at a second approximately constant torque for the second required CFM. The adjusting of between the first approximately constant torque and the second approximately constant torque may be completed by adjusting the selection device 511. This selection device 511 may make it possible to relatively easily change the CFM of the negative air filtration system 100 to match the particular needs of the environment (e.g., the room) in which it is being used. For example, this may remove the need of complex modifications to the negative air filtration system 100 when moving the negative air filtration system 100 from one room to another, which ultimately may save time.

The use of the terms "a" and "and" and "the" and similar referents, in the context of describing the invention, are to be construed to cover both the singular and the plural, unless otherwise indicated herein or cleared contradicted by context. The use of any and all example, or exemplary language (e.g., "such as", "e.g.", "for example", etc.) provided herein is intended merely to better illuminate the invention and does not pose a limitation on the scope of the invention unless otherwise claimed. No language in the specification should be construed as indicating any non-claimed elements as essential to the practice of the invention.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A negative air filtration system comprising:
    a housing comprising an inlet and an outlet;
    a pre-filter disposed within the housing, downstream of the inlet;
    a HEPA filter disposed within the housing, downstream of the pre-filter; and
    a fan assembly disposed within the housing, downstream of the pre-filter, the fan assembly in airflow communication with the pre-filter and the HEPA filter, the fan assembly generating a negative pressure across the pre-filter,
    wherein the inlet is disposed on a lower surface of the housing and the outlet is disposed on an upper surface of the housing, the inlet and the outlet being vertically oriented, the lower surface comprising a surface area of less than 4 sq. ft.

2. The negative air filtration system of claim 1, wherein the housing further comprises an interior surface, wherein an insulation is disposed on the interior surface.

3. The negative air filtration system of claim 2, wherein the insulation comprises an exterior foil surface and a fiberglass body.

4. The negative air filtration system of claim 1, further comprising a supply duct transition disposed on an upper surface of the housing, the supply duct transition comprising an outlet flange and an outlet plate, wherein the outlet plate includes a plurality of apertures disposed therein.

5. The negative air filtration system of claim 1, further comprising a pressure switch, the pressure switch operably connected to an indicator, the indicator disposed on the housing.

6. The negative air filtration system of claim 5, wherein the pressure switch comprises a tube, the tube comprising a first end and a second end, the first end disposed outside the housing and the second end disposed between the fan assembly and the HEPA filter.

7. The negative air filtration system of claim 5, wherein the indicator is configured to signal when at least one of the pre-filter and the HEPA filter are in need of replacement.

8. The negative air filtration system of claim 1, wherein the fan assembly comprises a constant torque motor comprising an operating torque.

9. The negative air filtration system of claim 8, wherein the constant torque motor is operably connected to a selection device, the selection device configured to adjust the operating torque.

10. The negative air filtration system of claim 9, wherein operating torque correlates to an approximately constant RPM, wherein the approximately constant RPM is between 800 and 1500 RPM.

11. The negative air filtration system of claim 8, wherein the fan assembly comprises a forward curved wheel blower.

12. The negative air filtration system of claim 1, wherein the HEPA filter comprises an exterior perimeter, a sealing assembly disposed about the exterior perimeter, the sealing assembly configured prevent a bypass around the HEPA filter.

13. The negative air filtration system of claim 12, wherein the sealing assembly comprises at least one gasket and at least one planar member.

14. The negative air filtration system of claim 12, further comprising a mounting rail disposed within the housing, the mounting rail disposed adjacent the sealing assembly.

15. The negative air filtration system of claim 1, further comprising a plurality of wheels disposed on the lower surface of the housing.

16. A method for operating a negative air filtration system comprising a housing comprising an inlet and an outlet, a pre-filter disposed downstream of the inlet, a HEPA filter disposed downstream of the pre-filter, and a fan assembly comprising a constant torque motor, the fan assembly disposed downstream of the pre-filter, the inlet disposed on a lower surface of the housing and the outlet is disposed on an upper surface of the housing, the inlet and the outlet being vertically oriented, the lower surface comprising a surface area of less than 4 sq. ft., the method comprising:

operating the negative air filtration system at a first required CFM for a first environment, the constant torque motor operating at a first approximately constant torque for the first required CFM; and operating the negative air filtration system at a second required CFM for a second environment, the constant torque motor operating at a second approximately constant torque for the second required CFM.

17. The method of claim 16, wherein the constant torque motor comprises a selection device configured to control the operating torque of the constant torque motor between the first approximately constant torque and the second approximately constant torque.

18. The method of claim 16, wherein the first approximately constant torque and the second approximately constant torque each respectively correlate to an approximately constant RPM, the approximately constant RPM between 800 and 1500 RPM.

* * * * *